(12) United States Patent
Matsuura et al.

(10) Patent No.: US 8,443,655 B2
(45) Date of Patent: May 21, 2013

(54) METHOD OF CONTROLLING FUEL COMPOSITION LEARNING

(75) Inventors: Kenji David Matsuura, Marysville, OH (US); Todd Robert Luken, Dublin, OH (US); Hirokazu Toyoshima, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 41 days.

(21) Appl. No.: 13/225,831

(22) Filed: Sep. 6, 2011

(65) Prior Publication Data
US 2013/0055798 A1    Mar. 7, 2013

(51) Int. Cl.
*G01M 15/04*    (2006.01)

(52) U.S. Cl.
USPC ........................ 73/114.32; 73/23.32

(58) Field of Classification Search
USPC ............................ 73/114.32, 23.32
See application file for complete search history.

(56) References Cited

U.S. PATENT DOCUMENTS

| | | | |
|---|---|---|---|
| 4,924,836 A | 5/1990 | Uchida et al. | |
| 4,945,880 A | 8/1990 | Gonze et al. | |
| 5,080,064 A | 1/1992 | Buslepp et al. | |
| 5,150,301 A | 9/1992 | Kashiwabara et al. | |
| 5,408,980 A | 4/1995 | Doering et al. | |
| 5,577,486 A | 11/1996 | Harima et al. | |
| 5,638,800 A | 6/1997 | Furuya et al. | |
| 5,692,478 A | 12/1997 | Nogi et al. | |
| 5,915,342 A | 6/1999 | Huff et al. | |
| 6,016,796 A | 1/2000 | Dalton | |
| 6,283,108 B1 * | 9/2001 | Matsufuji et al. | 123/690 |
| 6,389,874 B1 * | 5/2002 | Huff et al. | 73/1.02 |
| 6,425,369 B2 | 7/2002 | Arai et al. | |
| 6,760,657 B2 | 7/2004 | Katoh | |
| 6,904,899 B2 | 6/2005 | Kato | |
| 6,928,998 B2 * | 8/2005 | Abe | 123/674 |
| 7,650,874 B2 * | 1/2010 | Takubo | 123/434 |
| 7,739,025 B2 * | 6/2010 | Kawakita et al. | 701/106 |
| 7,908,073 B2 * | 3/2011 | Takubo | 701/103 |
| 7,950,269 B2 * | 5/2011 | Maeda et al. | 73/23.32 |
| 8,011,231 B2 * | 9/2011 | Maeda et al. | 73/114.45 |
| 2004/0162667 A1 * | 8/2004 | Abe et al. | 701/109 |

(Continued)

FOREIGN PATENT DOCUMENTS

| | | |
|---|---|---|
| JP | 62032238 | 2/1987 |
| JP | 2181045 | 7/1990 |

(Continued)

OTHER PUBLICATIONS

International Search Report and Written Opinion mailed Dec. 21, 2012 in International Application No. PCT/US2012/053279.

*Primary Examiner* — Freddie Kirkland, III
(74) *Attorney, Agent, or Firm* — Plumsea Law Group, LLC

(57) ABSTRACT

A method of controlling fuel composition learning includes steps of monitoring changes in airflow within an engine to determine steady state conditions. The method further includes steps of initiating a fuel composition learning process during steady state conditions. A current fuel component concentration factor is updated using a temporary fuel component concentration factor. The temporary fuel component concentration factor is calculated as the average of an air/fuel correction factor. Once the current fuel component concentration factor is updated, the temporary fuel component concentration factor is reset. The air/fuel correction factor is reset to reflect any difference that existed between the temporary fuel component concentration factor and the air/fuel correction factor at the update time.

14 Claims, 9 Drawing Sheets

U.S. PATENT DOCUMENTS

| | | |
|---|---|---|
| 2008/0270005 A1 | 10/2008 | Tooyama |
| 2009/0306879 A1 | 12/2009 | Takubo |
| 2011/0139118 A1 | 6/2011 | Glugla et al. |
| 2011/0178693 A1 | 7/2011 | Chang et al. |
| 2012/0330532 A1 * | 12/2012 | Matsuura et al. ............. 701/103 |

FOREIGN PATENT DOCUMENTS

| | | |
|---|---|---|
| JP | 5044539 | 2/1993 |
| JP | 2008115802 | 5/2008 |
| JP | 2009097459 | 5/2009 |

* cited by examiner

METHOD OF CONTROLLING FUEL COMPOSITION LEARNING

BACKGROUND

The embodiments relate to motor vehicles and in particular to a method of controlling fuel composition learning.

Motor vehicles capable of running on mixed fuels have been proposed. Mixed fuels include ethanol/gasoline mixtures such as E85. Some engines can be operated using gasoline or ethanol/gasoline mixtures. In some cases, methods of operating an engine may be modified to accommodate differences in the chemical properties of different kinds of mixed fuels.

SUMMARY

In one aspect, a method of controlling a fuel composition learning process includes receiving airflow information associated with an engine of the motor vehicle. The method further includes determining a change in airflow and retrieving a threshold range. The method also includes comparing the change in airflow with the threshold range and initiating a fuel composition learning process when the change in airflow is within the threshold range.

In another aspect, a method of updating a fuel component concentration factor includes retrieving a current fuel component concentration factor. The method also includes receiving an air/fuel correction factor and calculating a temporary fuel component concentration factor using the air/fuel correction factor. The method also includes setting the current fuel component concentration factor equal to the temporary fuel component concentration factor, thereby updating the current fuel component concentration factor. The method also includes setting the temporary fuel component concentration factor to a first value and setting the air/fuel correction value to a second value, where the first value is different from the second value.

In another aspect, a method of updating a fuel component concentration factor includes retrieving a current fuel component concentration factor. The method also includes receiving an air/fuel correction factor and calculating a temporary fuel component concentration factor using the air/fuel correction factor. The method also includes setting the current fuel component concentration factor equal to the temporary fuel component concentration factor, setting the air/fuel correction factor equal to the air/fuel correction factor divided by the temporary fuel component concentration factor and resetting the temporary fuel component concentration factor.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

Embodiments of the invention can be better understood with reference to the following drawings and detailed description. The components in the figures are not necessarily to scale, emphasis instead being placed upon illustrating the principles of embodiments of the invention. Moreover, in the figures, like reference numerals designate corresponding parts throughout the different views.

DETAILED DESCRIPTION

Figure 1:
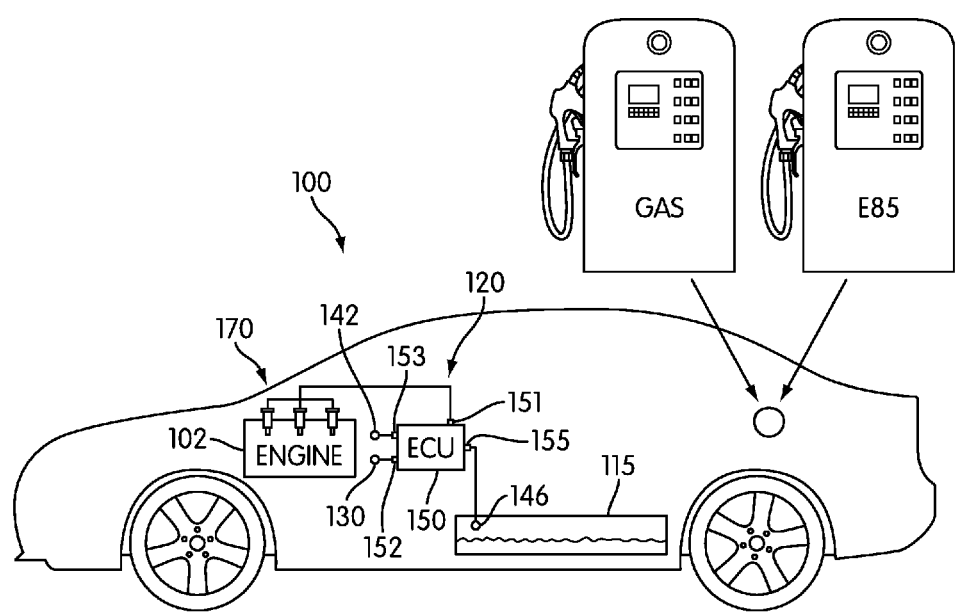
FIG. 1 is a schematic view of an embodiment of various components and systems for a motor vehicle.

FIG. 1 is a schematic view of an embodiment of motor vehicle 100. The term "motor vehicle" as used throughout this detailed description and in the claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, a motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drive train is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

For purposes of clarity, only some components of motor vehicle 100 are shown in the current embodiment. Furthermore, it will be understood that in other embodiments some of the components may be optional. Additionally, it will be understood that in other embodiments, any other arrangements of the components illustrated here can be used for powering motor vehicle 100.

Generally, motor vehicle 100 may be propelled by any power source. In some embodiments, motor vehicle 100 may be configured as a hybrid vehicle that uses two or more power sources. In other embodiments, motor vehicle 100 may use a single power source, such as an engine.

In one embodiment, motor vehicle 100 can include engine 102. In some cases, engine 102 may be configured to operate using various types of mixed fuels. The term "mixed fuel" as used throughout this detailed description and in the claims, applies to a mixture of two or more fuels. For example, in some cases, a mixed fuel may be a mixture of gasoline and ethanol. Generally, mixtures of gasoline and ethanol can include different proportions of ethanol including, but not limited to: E20, E75, E80, and E85. In other cases, other types of mixed fuels can be used including, but not limited to: methanol and gasoline mixtures, p-series fuels as well as other mixed fuels.

Motor vehicle 100 can include provisions for controlling engine 102. In some cases, motor vehicle 100 can include control system 120 that is configured to control one or more operations associated with engine 102. For example, in some cases, control system 120 could be used to control one or more fuel injectors associated with engine 102. Also, in some cases, control system 120 could be used to control one or more valves (such as intake or exhaust valves) associated with engine 102. In other cases, control system 120 could be used to control one or more spark plugs or other ignition devices associated with engine 102. In still other cases, control system 120 could be used to control a throttle valve associated with engine 102. In still other cases, control system 120 could be used to control any other systems associated with the operation of engine 102. Moreover, in an exemplary embodiment, control system 120 may be used to control multiple systems associated with engine 102 simultaneously.

Control system 120 may include provisions for communicating, and in some cases controlling, the various components associated with motor vehicle 100. In some embodiments, control system 120 may be associated with a computer or similar device. In the current embodiment, control system 120 may include electronic control unit 150, hereby referred to as ECU 150. In one embodiment, ECU 150 may be configured to communicate with, and/or control, various components of motor vehicle 100. In an exemplary embodiment, ECU 150 may be configured to communicate with and/or control engine 102. For example, in some cases, ECU 150 may be configured to control fuel injectors, spark plugs, valves, a throttle valve, as well as other components associated with engine 102. Furthermore, it should be understood that in some cases, ECU 150 could also be configured to communicate with and/or control various other systems associated with motor vehicle 100.

ECU 150 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 150 are optional. Some embodiments may include a given port or provision, while others may exclude it. The following description discloses many of the possible ports and provisions that can be used, however, it should be kept in mind that not every port or provision must be used or included in a given embodiment.

In some embodiments, ECU 150 may include port 151 for communicating with and/or controlling fuel injectors 170. Fuel injectors 170 could be any type of fuel injectors that are configured to inject fuel into one or more cylinders of an engine. Moreover, fuel injectors 170 could be further associated with other components of a fuel injection system including fuel rails, fuel pumps, fuel pressure regulators as well as various sensors, which are not shown here for purposes of clarity. For purposes of illustration, three fuel injectors are illustrated in the current embodiment, however in other embodiments any number of fuel injectors may be used with engine 102.

Although a single port is shown for communicating with fuel injectors 170, in other embodiments, multiple ports could be used so that each fuel injector communicates with ECU 150 using a separate port. Moreover, in other embodiments additional ports could be provided for communicating with other components or systems associated with engine 102 including, but not limited to: spark plugs, electronically controlled valves, an electronically controlled throttle as well as other systems utilized for the operation of engine 102.

In some embodiments, ECU 150 can include provisions for receiving information related to air flow in an engine. In some cases, ECU 150 may include port 152 for receiving information from air flow sensor 130. In some cases, airflow sensor 130 may be associated with an intake system of engine 102. In other cases, airflow sensor 130 can be associated with any other portion of engine 102.

In some embodiments, control system 120 may include provisions for sensing properties of an air/fuel mixture used to power engine 102. In some embodiments, control system 120 may include oxygen sensor 142. Generally, oxygen sensor 142 may be any type of sensor that is configured to provide information related to the properties of an air/fuel mixture. For example, in some cases, a linear air-fuel (LAF) sensor could be used to provide feedback about the oxygen content in an air/fuel mixture associated with engine 102. In one embodiment, oxygen sensor 142 may be a linear air-fuel sensor that is disposed in an exhaust manifold of engine 102. Information from oxygen sensor 142 may be received at ECU 150. In particular, ECU 150 may receive information from oxygen sensor 142 through port 153. Using this arrangement, ECU 150 may be configured to estimate the air/fuel ratio of an air/fuel mixture used to power engine 102. Although a single oxygen sensor is shown in the current embodiment, other embodiments could include multiple oxygen sensors disposed in various portions of an exhaust system.

In some embodiments, control system 120 can include provisions for sensing the amount or level of a fuel in fuel tank 115 of motor vehicle 100. In the current embodiment, control system 120 may be associated with fuel level sensor 146. Generally, fuel level sensor 146 may be any type of sensor that is capable of detecting the fuel level within a fuel tank.

In an embodiment, ECU 150 may include port 155 for receiving information from fuel level sensor 146. Using this arrangement, control system 120 may be configured to determine when a vehicle has recently refueled, since the fuel level within fuel tank 115 will generally rise as new fuel is added. Moreover, in vehicles capable of operating on different types of fuels, a refueling event may signal the possibility that the fuel content has changed. For example, if the fuel content prior to refueling was mostly gasoline, but the vehicle was refueled with an E85 ethanol-gas mixture, the fuel content will change. Therefore, control system 120 may be configured to modify the operation of one or more systems according to the new fuel content as discussed in detail below.

Figure 2:
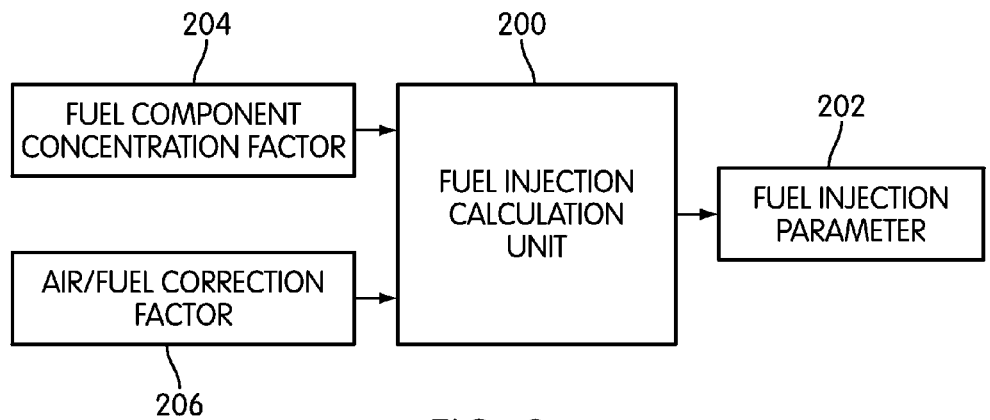
FIG. 2 is a schematic view of an embodiment of inputs and outputs of a fuel injection calculation unit.

FIG. 2 illustrates a schematic view of an embodiment of a fuel injection calculation unit 200. Fuel injection calculation unit 200 may be configured to calculate fuel injection parameter 202 associated with the amount of fuel to be injected into an air/fuel mixture that is combusted within engine 102. In some cases, fuel injection parameter 202 may be an injection time indicating the amount of time that an injector may be opened to deliver fuel. In other cases, fuel injection parameter 202 may be characterized by a particular volume or quantity of fuel.

Fuel injection calculation unit 200 may receive one or more inputs. In some cases, fuel injection calculation unit 200 may receive fuel component concentration factor 204 and air/fuel correction factor 206. The term "fuel component concentration factor" as used throughout this detailed description and in the claims refers to a factor that characterizes the concentration of one or more fuel components in a fuel. In some cases, a fuel component could be a particular chemical component such as an alcohol or a hydrocarbon such as gasoline. Examples of fuel components include, but are not limited to: gasoline, methanol, ethanol, as well as any other hydrocarbons, alcohols or other chemical substances found in fuels. In one embodiment, the fuel component concentration factor may be an ethanol concentration factor characterizing the ethanol concentration of a fuel.

In some cases, a fuel component concentration factor may be a learned value. In some cases, a fuel composition learning process may be used to determine the fuel component concentration factor. For example, in embodiments where mixed fuels comprising ethanol are used, the fuel component concentration factor may be determined by an ethanol learning process. In other embodiments, however, the fuel component concentration factor may be measured directly using a fuel component sensor disposed inside a fuel tank or fuel line.

Air/fuel correction factor 206 is a feedback correction factor used to correct the air/fuel ratio in order to achieve a target air/fuel ratio. In some cases, air/fuel correction factor 206 may be determined using information from one or more oxygen sensors, such as oxygen sensor 142 (see FIG. 1). In other cases, air/fuel correction factor 206 can be determined using information from any other sensors. Moreover, any method known in the art for calculating an air/fuel correction factor can be used.

For purposes of clarity, only some inputs to fuel injection calculation unit 200 are shown. It will be understood that in other embodiments fuel injection calculation unit 200 may receive various other inputs in addition to fuel component concentration factor 204 and air/fuel correction factor 206. Examples of other parameters that could be used include, but are not limited to: engine temperature, pressure, ignition timing information, as well as any other operating parameters or calculated values associated with the operation of an engine or any other components of the motor vehicle.

Figure 3:
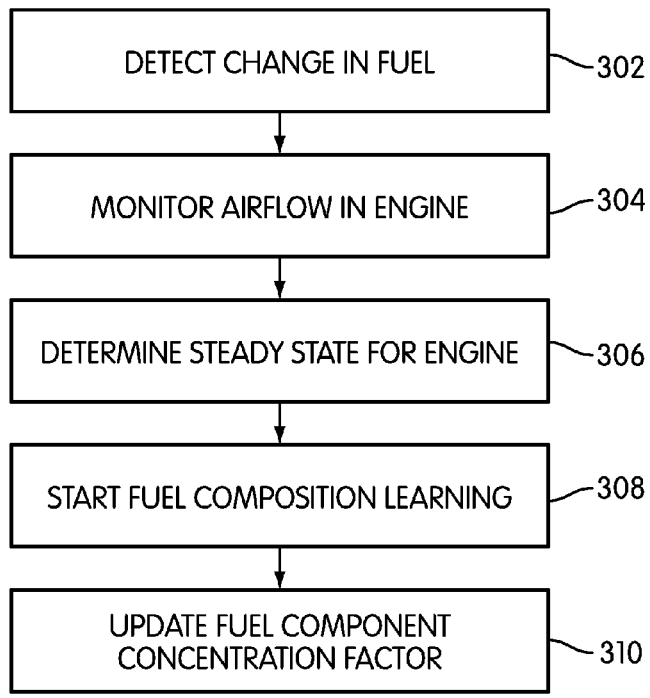
FIG. 3 is an embodiment of a process for updating a fuel component concentration factor.

FIG. 3 illustrates an embodiment of a process for controlling fuel injection. In some embodiments, some of the following steps could be accomplished by a control system of a motor vehicle. In some cases, some of the following steps may be accomplished by an ECU of a motor vehicle. In other embodiments, some of the following steps could be accomplished by other components of a motor vehicle. It will be understood that in other embodiments one or more of the following steps may be optional or may be performed in an order that differs from what is shown.

In step 302, a control system may detect a change in the fuel used to operate an engine. In some cases, the control system could sense a change in the fuel level that would indicate a recent refueling event. For example, in one embodiment, the control system may sense a fuel level change using information from fuel level sensor 146 (see FIG. 1). Refueling events may indicate a possible change in fuel composition if a driver refuels using a different type of mixed fuel from the previous refueling. In other embodiments, the control system could directly sense changes in the fuel composition using information from sensors capable of determining fuel properties.

In step 304, the control system may monitor the airflow through the engine. In some cases, the control system may receive information from airflow sensor 130 (see FIG. 1). Next, in step 306, the control system may determine if the engine is operating in steady state conditions. If so, the control system may start fuel composition learning in step 308. During fuel composition learning, the control system may estimate the concentration of one or more fuel components in a fuel. For example, in some cases, the control system may estimate the concentration of ethanol in a fuel.

In step 310, the control system may update the fuel component concentration factor based on the fuel composition learning that occurs in step 308. For example, the control system may determine an updated value for the ethanol concentration in the fuel following the refueling event. Using this updated fuel component concentration factor, the control system may then proceed to calculate a fuel injection parameter as discussed in FIG. 2.

A control system can include provisions for determining if steady state conditions are occurring, since state conditions may be required to begin or finish fuel composition learning. In some cases, a control system could monitor airflow through an engine. In particular, in some cases, a control system could monitor the change in airflow between successive top dead-center positions of a piston to determine if an engine is operating in a steady state condition. In some situations, whenever the change in airflow is very small, the control system may assume steady state conditions are occurring.

Figure 4:
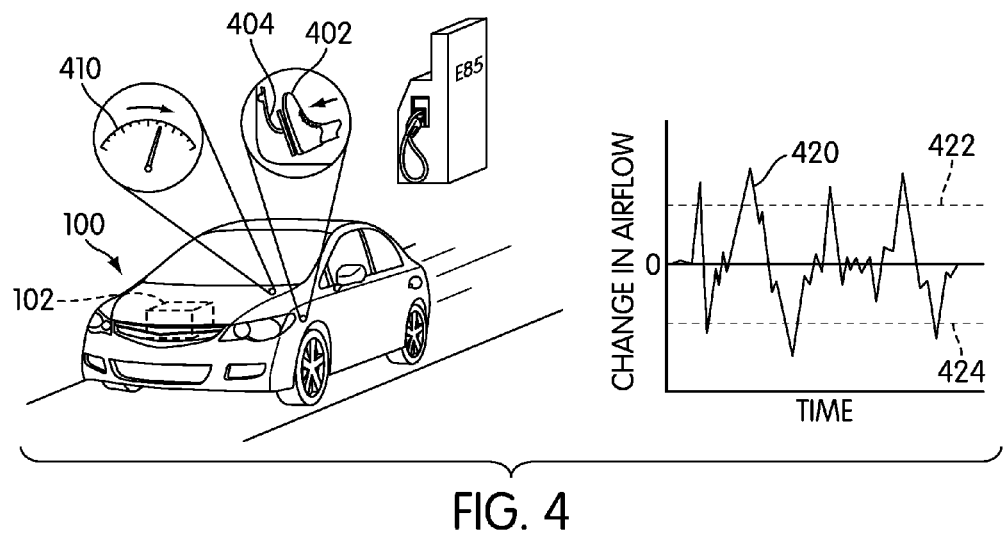
FIG. 4 is a schematic view of an embodiment of a motor vehicle operating in a non-steady state condition while accelerating.
Figure 5:
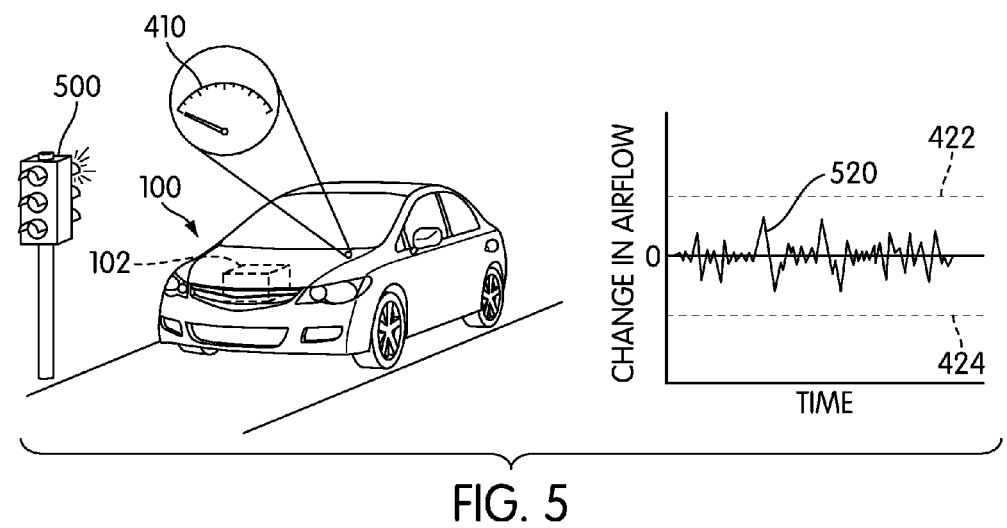
FIG. 5 is a schematic view of an embodiment of a motor vehicle operating in a steady state condition while idling.
Figure 6:
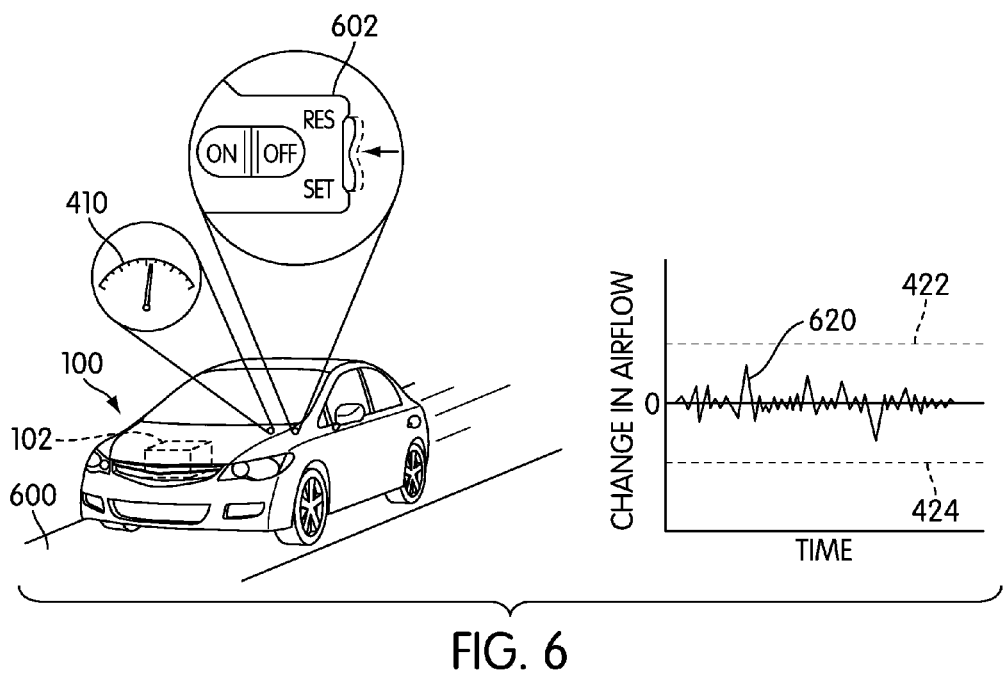
FIG. 6 is a schematic view of an embodiment of a motor vehicle operating in a steady state condition while maintaining a constant cruising speed.

FIGS. 4 through 7 illustrate embodiments of a motor vehicle in various operating conditions following a recent refueling event. In particular, FIG. 4 illustrates a non-steady state condition for motor vehicle 100, while FIGS. 5 and 6 illustrate to examples of steady state conditions for motor vehicle 100. Referring to FIG. 4, motor vehicle 100 pulls out of a gas station after refueling with E85 fuel. In this case, the vehicle was previously operated using gasoline, so the ethanol concentration of the fuel has been increased following the refueling event. In order to update the fuel component concentration factor, the control system must wait for a steady state situation to occur. At this point, motor vehicle 100 is accelerating as driver 402 depresses acceleration pedal 404. In particular, the speed of motor vehicle 100 is increasing as indicated by speedometer 410.

In this situation, the airflow within engine 102 varies greatly as motor vehicle 100 accelerates. For purposes of illustration, the change in airflow within engine 102 is indicated schematically as a function of time. In particular, change in airflow 420 fluctuates between positive and negative numbers. Furthermore, change in airflow 420 fluctuates outside of upper threshold value 422 and lower threshold value 424. The control system may monitor the airflow and determine that motor vehicle 100 is not operating in a steady state due to large changes in airflow.

Referring now to FIG. 5, motor vehicle 100 pulls up to traffic light 500. In this situation, engine 102 may be idling. The vehicle speed is 0 mph, as indicated by speedometer 410. In this situation, the airflow within engine 102 does not vary significantly, since engine 102 is idling. For purposes of illustration, the change in airflow within engine 102 is indicated schematically as a function of time. In particular, change in airflow 520 fluctuates between positive and negative numbers. In this situation, change in airflow 520 fluctuates around zero. Moreover, change in airflow 520 does not exceed upper threshold value 422 or lower threshold value 424. The control system may monitor the airflow and determine that motor vehicle 100 is operating in a steady state due to the small changes in airflow.

Referring to FIG. 6, motor vehicle 100 may be cruising on highway 600. In this case, a driver has activated cruise control 602 so that motor vehicle 100 travels at a substantially constant speed, as indicated by speedometer 410. In this situation, the airflow within engine 102 does not vary much, since motor vehicle 100 is traveling at a constant speed and is not accelerating or decelerating. For purposes of illustration, the change in airflow within engine 102 is indicated schematically as a function of time. In particular, change in airflow 620 fluctuates between positive and negative numbers. In this situation, change in airflow 620 fluctuates around zero. Moreover, change in airflow 620 does not exceed upper threshold value 422 or lower threshold value 424. The control system may monitor the airflow and determine that motor vehicle 100 is operating in a steady state due to the small changes in airflow.

By monitoring the change in airflow within an engine, a control system can determine steady state conditions for starting or completing fuel composition learning. This may reduce the time that is required to activate or complete fuel composition learning over systems that require wide open throttle conditions or fuel cut conditions to begin or complete fuel composition learning.

Figure 7:
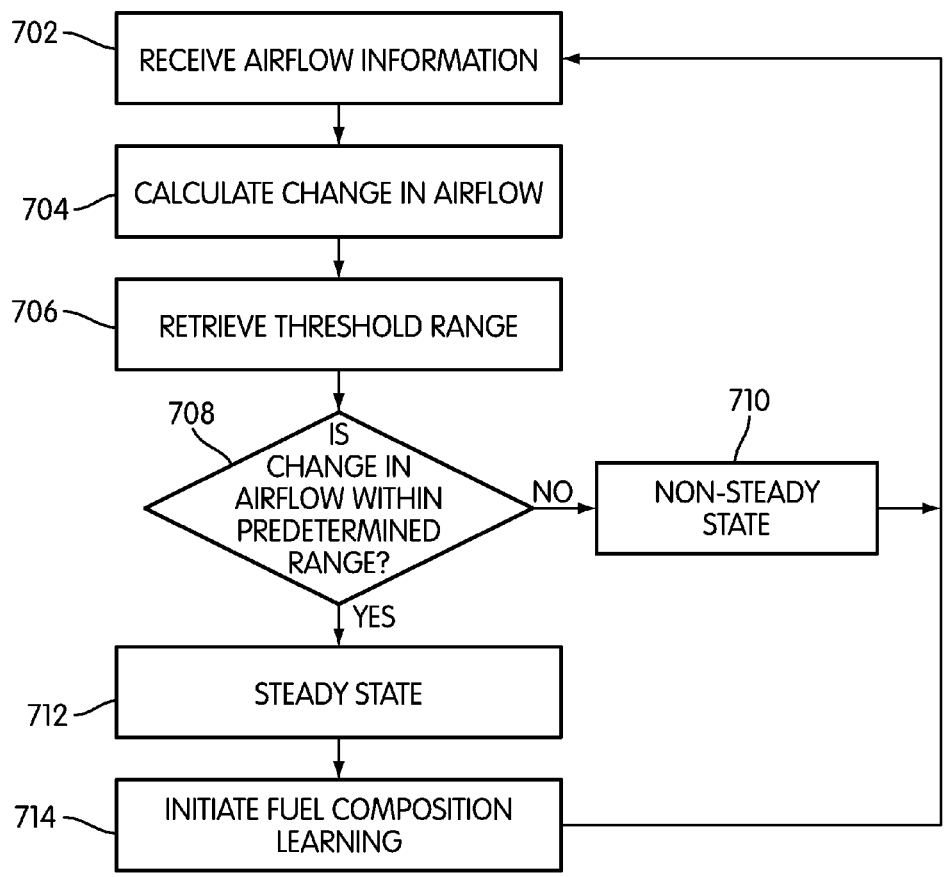
FIG. 7 is an embodiment of a process for initiating fuel composition learning.

FIG. 7 illustrates an embodiment of a process for initiating fuel composition learning during steady state conditions. In some embodiments, some of the following steps could be accomplished by a control system of a motor vehicle. In some cases, some of the following steps may be accomplished by an ECU of a motor vehicle. In other embodiments, some of the following steps could be accomplished by other components of a motor vehicle. It will be understood that in other embodiments one or more of the following steps may be optional.

In step 702, the control system may receive airflow information. In some cases, the airflow information may be received from airflow sensor 130 (see FIG. 1). Next, in step 704, the control system may calculate the change in airflow. Generally, the change in airflow may be calculated for any time period. In some embodiments, the change in airflow may be calculated between successive top dead-center positions of a piston in engine 102. In other embodiments, the change in airflow may be calculated over any other time period or cycle associated with engine 102.

In step 706, the control system may retrieve a threshold range. The threshold range could be associated with an upper threshold and a lower threshold. The upper threshold and lower threshold may be set so that values of the change in airflow within the predetermined range correspond to approximately constant airflow. In other cases, a single threshold value could be used, rather than a threshold range. The threshold range could be stored in memory within the ECU or any other component or system of the motor vehicle.

In step 708, the control system may determine if the change in airflow is within the predetermined range. In other words, the control system may determine if the change in airflow is less than an upper threshold and greater than a lower threshold. In some cases, the control system may monitor the change in airflow over a predetermined amount of time, to determine if steady state conditions are occurring. For example, in some cases, the control system could monitor the change in airflow over a time period of milliseconds. In other cases, the control system could monitor the change in airflow over a time period of seconds. In still other cases, the control system could monitor the change in airflow over a time period of minutes. In some situations, the period of time may be selected to correspond with the amount of time required to complete fuel composition learning.

If the change in airflow is not within the predetermined range, the control system may proceed to step 710. In step 710, the control system determines that the engine is not operating in a steady state condition and proceeds back to step 702. If, during step 708, the control system determines that the change in airflow is within the predetermined range, the control system proceeds to step 712. During step 712, the control system determines that the engine is operating in a steady state condition. In step 714, the control system may initiate fuel composition learning to determine a concentration value for a fuel component. In one embodiment, during step 714, the control system may initiate an ethanol composition learning process to estimate the concentration of ethanol in the fuel.

A control system can include provisions for reducing stumble and hesitation in an engine that may occur during fuel composition learning. In some cases, a control system may include provisions to ensure a fuel injection parameter (such as injection time or injection volume) varies in a smooth manner throughout the fuel composition learning process.

Figure 8:
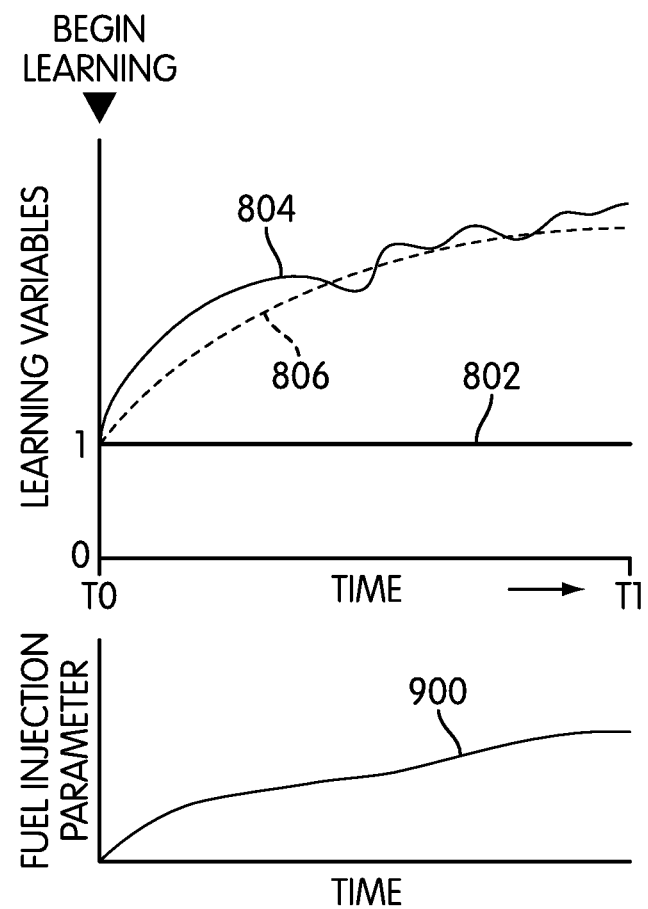
FIG. 8 is a view of an embodiment of the behavior of various learning parameters as a function of time.
Figure 9:
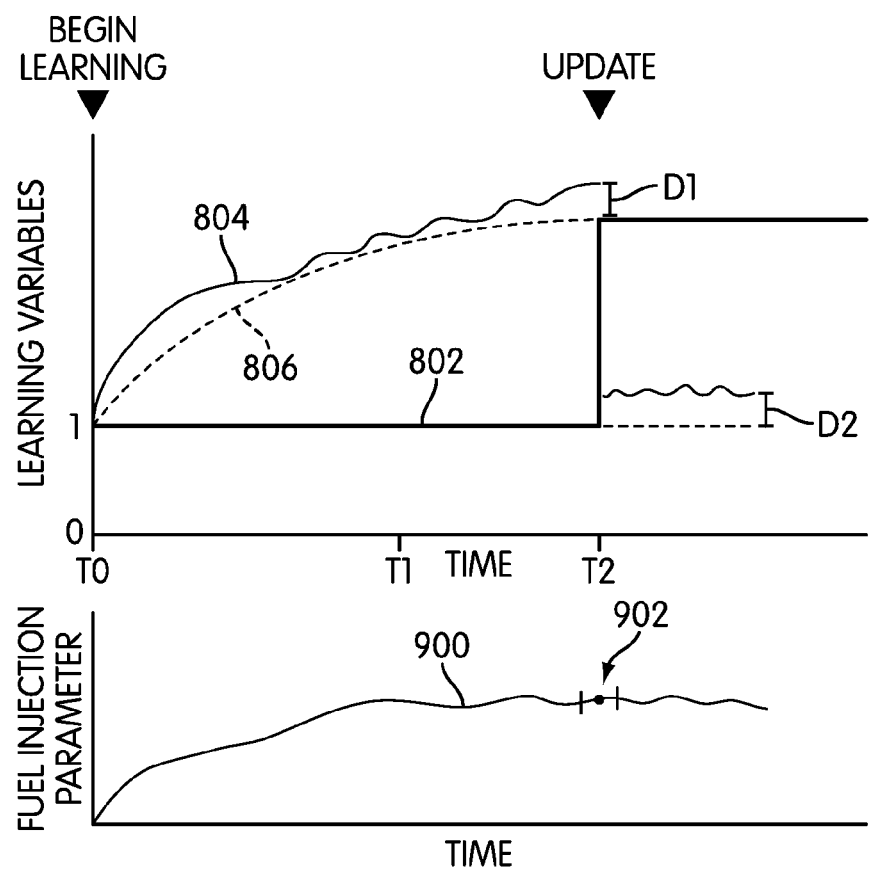
FIG. 9 is a view of an embodiment of the behavior of various learning parameters as a function of time, in which an offset is maintained between the air/fuel correction factor and the temporary fuel component concentration factor as the fuel component concentration is updated.

FIGS. 8 and 9 illustrate an embodiment of the values of various parameters as a function of time during a fuel composition learning process. Referring to FIG. 8, current fuel component concentration factor 802 remains constant between time T0 and time T1. Current fuel component concentration factor 802 represents the estimated concentration of a particular fuel component. In some cases, current fuel component concentration factor 802 may represent the estimated ethanol concentration in a mixed fuel. Current fuel component concentration factor 802 may be a learned value that was determined during a previous learning process.

At time T0, the learning process is initiated, as discussed in step 714 of FIG. 7. In particular, the control system has determined that the engine is operating in a steady state condition. For purposes of clarity, at the beginning of the learning process, current fuel component concentration factor 802 has a value of 1. In other cases, current fuel component concentration factor 802 could start at another value.

The value of air/fuel correction factor 804 is also shown as a function of time. Moreover, it will be understood that air/fuel correction factor 804 and current fuel component concentration factor 802 are both used as inputs for calculating fuel injection parameter 900, which is also shown in FIG. 8 as a function of time. In other words, fuel injection parameter 900 may vary as either air/fuel correction factor 804 or current fuel component concentration factor 802 vary. In this case, with current fuel component concentration factor 802 constant from time T0 to time T1, the value of fuel injection parameter 900 varies as air/fuel correction factor 804 varies in time.

Starting at time T0, air/fuel correction factor 804 begins to increase. Specifically, air/fuel correction factor 804 increases in a non-linear manner between time T0 and time T1. As previously discussed, air/fuel correction factor 804 represents a factor used to correct the air/fuel ratio in order to achieve a target air/fuel ratio. In some cases, the value of air/fuel correction factor 804 will be affected by the concentration of one or more alcohols in the fuel.

As air/fuel correction factor 804 increases between time T0 and time T1, the control system calculates a running average value of air/fuel correction factor 804. This running average is stored as a new parameter. In the current embodiment, the running average of air/fuel correction factor 804 is labeled temporary fuel component concentration factor 806. This designation is used since the average deviation of the air/fuel correction factor 804 away from a value of 1 may correspond to variations in the fuel composition. As seen in FIG. 8, temporary fuel component concentration factor 806 tracks the average behavior of air/fuel correction factor 804.

Referring now to FIG. 9, as the learning process continues, air/fuel correction factor 804 may level off. In other words, while air/fuel correction factor 804 may vary slightly, the average value of air/fuel correction factor 804 changes more slowly with time. This can be seen by observing the value of temporary fuel component concentration factor 806, which levels off between time T1 and time T2.

At time T2, the control system performs an update of the current fuel component concentration factor. In some cases, the update may be performed after a timer has expired. For example, in some cases the control system initiates a timer at the beginning of the learning process, which expires at time T2. In other cases, the control system may perform the update once the temporary fuel component concentration factor appears to have achieved an approximately constant value. In still other cases, the control system may perform the update once the rate of change of the temporary fuel component concentration factor is below a threshold rate of change. In still other cases, any other methods known in the art for determining a time to perform an update can be used.

At the time of updating, the value of current fuel component concentration factor 802 is updated to have the value of temporary fuel component concentration factor 806. Using this arrangement, the current fuel component concentration factor 802 is adjusted to reflect the large deviation of air/fuel correction factor 804 away from 1, which may be partially due to change in fuel composition.

In addition, at the time of updating, the control system may reset the values of air/fuel correction factor 804 and temporary fuel component concentration factor 806. In some cases, temporary fuel component concentration factor 806 may be set to a first value and air/fuel correction factor 804 may be set to a second value. In some cases, the first value may be substantially different from the second value. In other cases, the first value may be substantially similar to the second value. In some cases, the second value may be substantially greater than the second value.

Air/fuel correction factor 804 may be recalculated to reflect any differences between air/fuel correction factor 804 and temporary fuel component concentration factor 806 at the time of the update. For example, in the current embodiment, the difference between air/fuel correction factor 804 and temporary fuel component concentration 806 is equal to difference D1. At the update time, air/fuel correction factor 804 is recalculated as the ratio of air/fuel correction factor 804 to temporary fuel concentration factor 806. Moreover, temporary fuel component concentration factor 806 is reset to 1. Therefore, air/fuel correction factor 804 and temporary fuel component concentration factor 806 are offset by difference D2 just after the update.

Generally, offset D1 and offset D2 may be substantially different values. Furthermore, offset D2 may be generally less than offset D1. Of course, there may not be any offset at the update time, in which case both values would be reset to 1. With this arrangement, the air/fuel correction factor may not always be reset to a value of 1 at the time of the fuel component concentration update. Moreover, any offset between air/fuel correction factor 804 and temporary fuel component concentration factor 806 at the time of update is reflected in their respective values following the update in order to maintain an approximately continuous fuel injection amount before and after the update process.

FIG. 9 also illustrates an embodiment of a relationship between fuel injection parameter and time throughout the learning process. As seen in FIG. 9, fuel injection parameter 900 remains approximately continuous throughout the learning process. Furthermore, fuel injection parameter 900 remains approximately continuous at update time T2. In other words, fuel injection parameter 900 varies smoothly throughout time interval 902, which corresponds to the interval of time just before and just after update time T2. This configuration helps to reduce stumble and hesitation that might otherwise occur following an update of the fuel component concentration factor.

Figure 10:
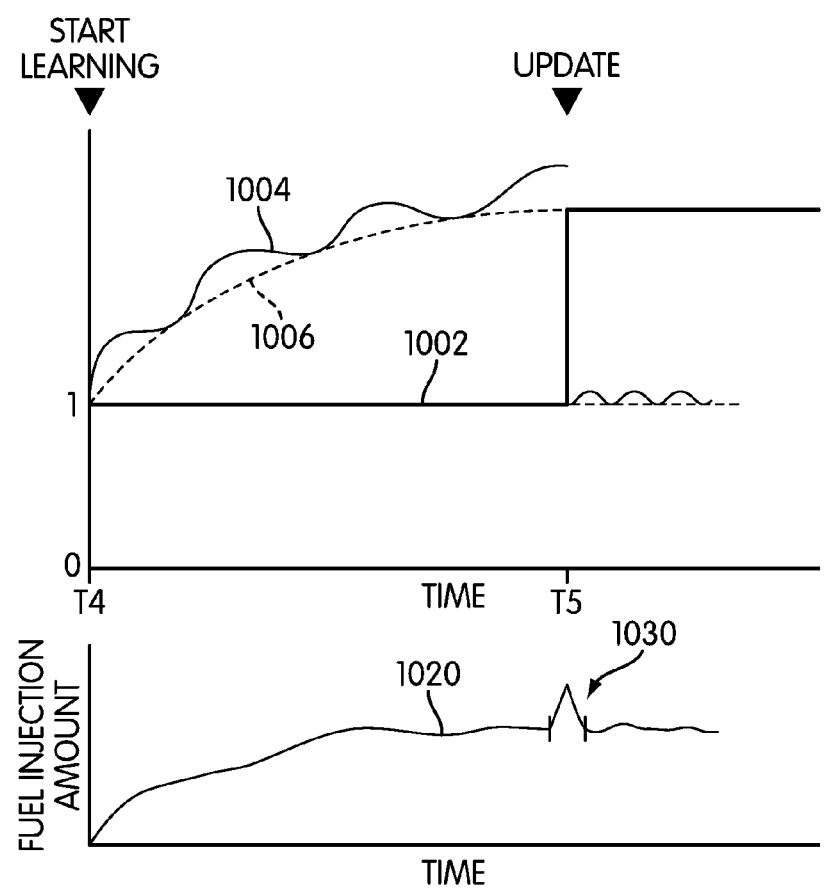
FIG. 10 is a view of an alternative embodiment of the behavior of various learning parameters as a function of time.

FIG. 10 illustrates an alternative embodiment of the relationship of various learning parameters as a function of time. In particular, the various learning parameters shown in FIG. 10 correspond to a situation where the difference between the air/fuel correction factor is reset to 1 when the current fuel component concentration factor is updated.

Referring to FIG. 10, the learning process may proceed in a similar manner to the process described and shown in FIGS. 8 and 9 with some modifications. Initially, at time T4, current fuel component concentration factor 1002 is constant and has a value of 1. Moreover, starting at time T4, air/fuel correction factor 1004 begins to increase in a non-linear manner. Temporary fuel component concentration factor 1006 is similarly calculated as a running average of air/fuel correction factor 1004.

At update time T5, the value of current fuel component concentration factor 1002 is set to the value of temporary fuel component concentration factor 1006. Following this, the value of temporary fuel component concentration factor 1006 is reset to 1. In addition, the value of air/fuel correction factor 1004 is also reset to 1. Since the offset between air/fuel correction factor 1004 and temporary fuel component concentration factor 1006 is not maintained following update time T5, the fuel injection parameter may change abruptly. For example, fuel injection parameter 1020 varies in a non-smooth manner within interval 1030, which corresponds to the time just previous to update time T5 and just after update time T5. This sudden change in fuel injection parameter 1020 may cause stumble and hesitation in an engine that may diminish the driving experience.

Figure 11:
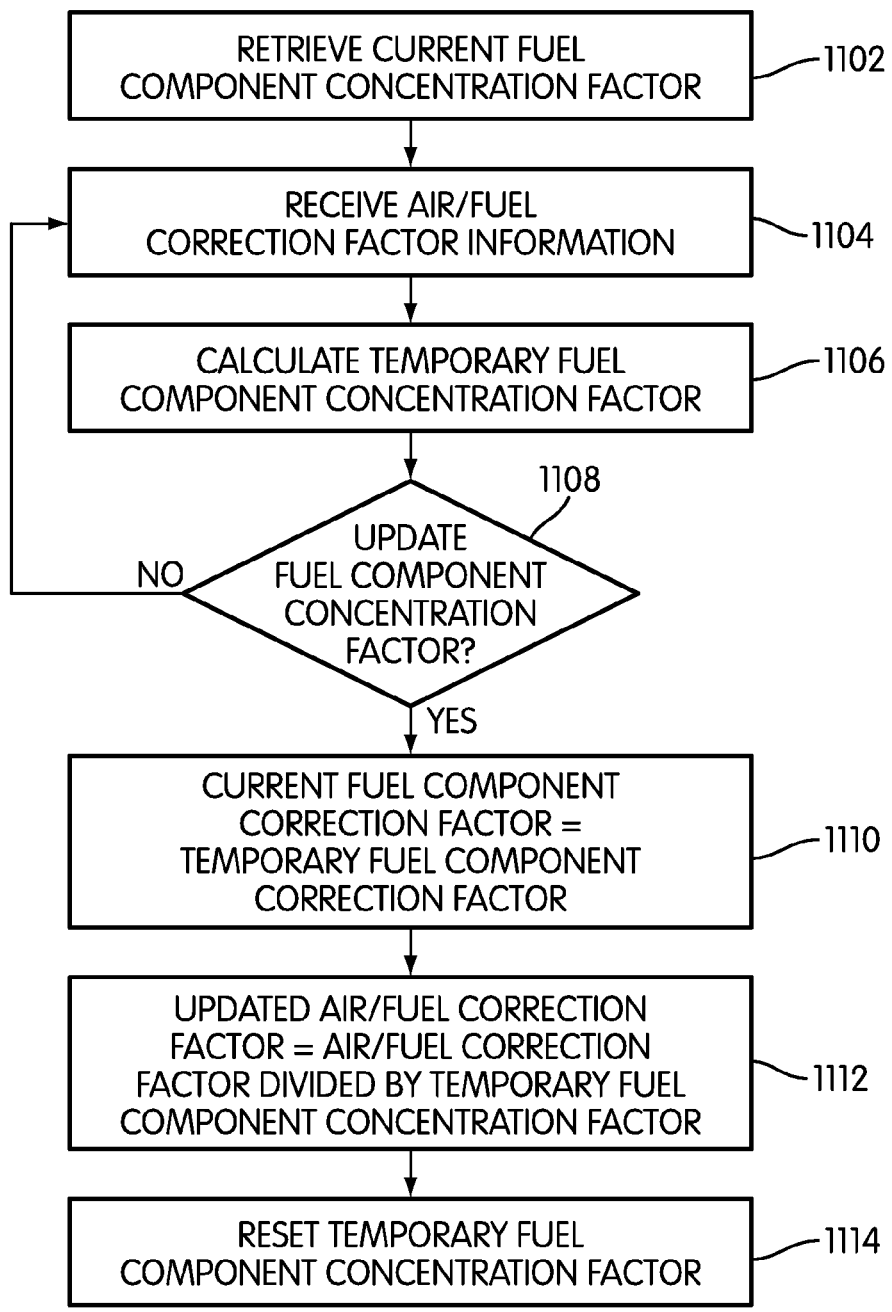
FIG. 11 is an embodiment of a process for updating a fuel component concentration factor.

FIG. 11 illustrates an embodiment of a process for updating a fuel component concentration factor. In some embodiments, some of the following steps could be accomplished by a control system of a motor vehicle. In some cases, some of the following steps may be accomplished by an ECU of a motor vehicle. In other embodiments, some of the following steps could be accomplished by other components of a motor vehicle. It will be understood that in other embodiments one or more of the following steps may be optional.

In step 1102, the control system may retrieve the current fuel component concentration factor. In some cases, the current fuel component concentration factor may be stored in memory. Next, in step 1104, the control system may receive the air/fuel correction factor information. The air/fuel correction factor may be determined from information from various sensors including one or more oxygen sensors.

In step 1106, the control system may calculate a temporary fuel component concentration factor. As discussed in FIGS. 8 and 9, the temporary fuel component concentration factor may be determined by taking an average of the air/fuel correction factor. In some cases, the average may be taken over some predetermined time step.

In step 1108, the control system may determine if the fuel component concentration factor should be updated. In some cases, the control system may check to see if a timer has expired. In other cases, any other method for determining if the fuel component concentration factor should be updated can be used. If the fuel component concentration factor is to be updated, the control system proceeds to step 1110. Otherwise, the control system proceeds back to step 1104. At this point, step 1104 and step 1106 may be repeated as the air/fuel correction factor continues to vary and the temporary fuel component concentration factor is continuously calculated to track the average behavior of the air/fuel correction factor.

In step 1110, the control system sets the current fuel component concentration factor equal to the temporary fuel component concentration factor. Then, in step 1112, the control system recalculates an updated value for the air/fuel correction factor. In some cases, the updated air/fuel correction factor is set equal to the current value of the air/fuel correction factor divided by the temporary fuel component concentration value.

In step 1114, the control system resets the temporary fuel component concentration factor. In some cases, the temporary fuel component concentration factor may be reset to 1. In other cases, the temporary fuel component concentration factor may be reset to a value other than 1.

Using this arrangement, any offset between the air/fuel correction factor and the temporary fuel component concentration factor at the update time is reflected in their respective values following the update time. This helps to reduce stumble and hesitation.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of updating a fuel component concentration factor, comprising:
    retrieving a current fuel component concentration factor;
    receiving an air/fuel correction factor;
    calculating a temporary fuel component concentration factor using the air/fuel correction factor;
    setting the current fuel component concentration factor equal to the temporary fuel component concentration factor, thereby updating the current fuel component concentration factor;
    setting the temporary fuel component concentration factor to a first value;
    setting the air/fuel correction value to a second value; and
    wherein the first value is different from the second value.

2. The method according to claim 1, wherein the first value is 1.

3. The method according to claim 1, wherein the second value is greater than 1.

4. The method according to claim 1, wherein the second value is equal to the air/fuel correction factor divided by the temporary fuel component concentration factor.

5. The method according to claim 1, wherein the retrieved value of the fuel component concentration factor is 1.

6. The method according to claim 1, wherein the current fuel component concentration factor is updated during steady state conditions.

7. The method according to claim 1, wherein the difference between the first value and the second value is related to the difference between the temporary fuel component concentration factor and the air/fuel correction factor before the current fuel component concentration factor has been updated.

8. A method of updating a fuel component concentration factor, comprising:
    retrieving a current fuel component concentration factor;
    receiving an air/fuel correction factor;
    calculating a temporary fuel component concentration factor using the air/fuel correction factor;
    setting the current fuel component concentration factor equal to the temporary fuel component concentration factor;
    setting the air/fuel correction factor equal to the air/fuel correction factor divided by the temporary fuel component concentration factor; and
    resetting the temporary fuel component concentration factor.

9. The method according to claim 8, wherein the temporary fuel component concentration factor is reset to 1.

10. The method according to claim 8, wherein the fuel component concentration factor is an ethanol concentration factor.

11. The method according to claim 8, wherein the temporary fuel component concentration factor is an average of successive values of the air/fuel correction factor.

12. The method according to claim 8, wherein the current fuel component concentration factor is only updated during steady state conditions.

13. The method according to claim 12, wherein steady state conditions are determined by monitoring a change in airflow in an engine.

14. The method according to claim 8, wherein the temporary fuel component concentration factor is reset to the retrieved value of the current fuel component concentration factor.

* * * * *